April 15, 1952     A. MOESSINGER     2,592,819
CLAW CLUTCH
Filed Aug. 27, 1945
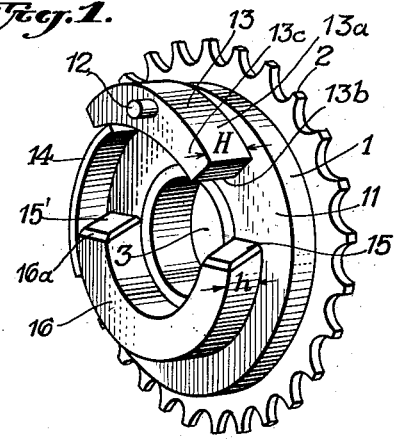
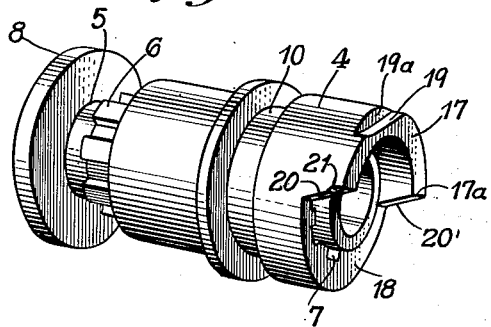
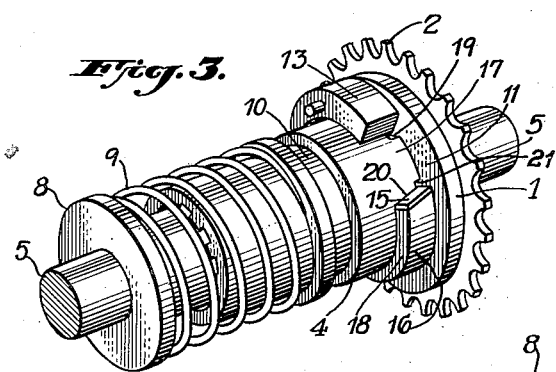
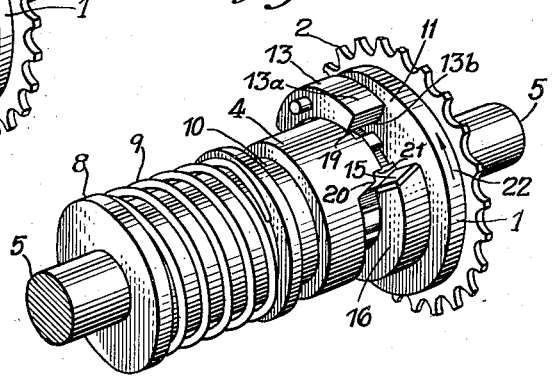
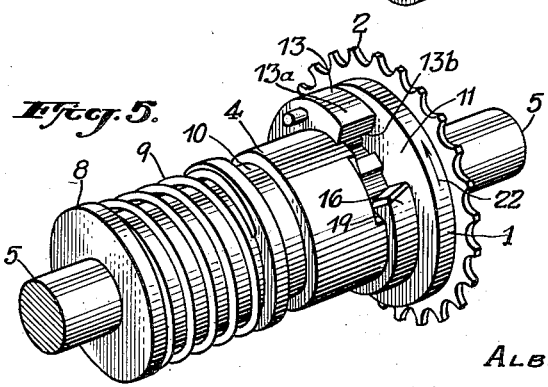
INVENTOR.
ALBERT MOESSINGER.
BY
*K. A. Mayr*
ATTORNEY.

Patented Apr. 15, 1952

2,592,819

UNITED STATES PATENT OFFICE 2,592,819

CLAW CLUTCH

Albert Moessinger, Winterthur, Switzerland, assignor to Sulzer Freres, Societe Anonyme, Winterthur, Switzerland Application August 27, 1945, Serial No. 612,864
In Switzerland January 20, 1945

5 Claims. (Cl. 192—67)

The present invention relates to a claw coupling particularly for looms. It consists primarily in the provision of a blocking member which is fixed to one coupling half and falls in front of a contact surface of the second coupling half when the coupling is disengaged and keeps the two coupling halves apart by at least the disengaging length during a definite relative angle of turning, so that the coupling is prevented from re-engaging.

In a suitable embodiment, the blocking member with its blocking portion falls in between the coupling halves in such a way that the two coupling halves are held apart by at least the disengaging length during a certain relative angle of turning. The axial extension of the blocking portion may be made at least equal to the axial extension of the claw. It is preferable that, when turning one coupling half with respect to the other, at least one claw face slide on the blocking portion of the blocking member until the claw faces are at least partly opposite each other and one claw face has moved from the face of the blocking member to the opposite claw face. On the claw face of one coupling half, a recess may be provided into which, when the coupling is disengaged, a blocking member falls, the axial extension of the blocking member being greater than the axial extension of the claws by at least the axial depth of the recess.

It is preferable that the recess on the claw head slide on the blocking portion of the blocking member when one coupling half is turned with respect to the other until the claw faces of the two coupling halves cover each other at least to a certain extent and can turn further while sliding on each other. Preferably, the blocking member is held yieldingly in blocking position by means of a spring to assure correct action of the blocking member before the claw head of one coupling half slides from the claw head of the other coupling half. One coupling half is axially displaceable and is preferably pressed against the second coupling half by at least one spring, which effects the automatic re-engagement as soon as the claw faces no longer cover each other. The coupling half movable axially may be arranged to turn positively with a shaft on which the second coupling half is mounted to turn but is immovable in the axial direction. For certain applications of the new clutch, it may be desirable for the second coupling half to be stationary and unmovable.

The adoption of the claw coupling according to the invention is of advantage wherever the coupling halves, engaging one another during normal service, are to be uncoupled and temporarily blocked in this position, whereby this blocking position may be used for the performance of another control step. The relative rotation of the two coupling halves may amount at the most to 360° before the two coupling halves again engage automatically.

The claw coupling according to the invention could, for instance, be inserted in a mechanism for driving the auxiliary motions in looms, in order to facilitate reversing the shed or the movement of the harnesses from the open shed into the closed shed position and vice versa, whereby the changing of defectively inserted weft threads or the drawing in of broken wrap threads can be performed more quickly, since the number of motions to be carried out by the attendants is decreased and the motions remaining to be effected are simplified. The claw coupling according to the invention could, however, also be built into agitating mechanisms, machine tools, etc.

One embodiment of the invention is shown in the accompanying drawing.

Fig. 1 shows one coupling half and
Fig. 2 the second coupling half in perspective.
Fig. 3 shows the two coupling halves in the coupled position, in perspective.
Figs. 4 and 5 show intermediate positions of the two coupling halves in perspective.

The coupling half or clutch part shown in Fig. 1 has a claw ring 1 fitted with a sprocket wheel 2 and a shaft bore 3, the claw ring 1 being also fitted with a claw 16 which adjoins with inclined flanks 15 and 15' the claw space 11. On the ring 1 is also fixed a pin 12 projecting parallel to the rotation axis of the clutch into the claw space 11; the blocking pawl 13 is swingably carried by pin 12. The blocking portion 13a of the blocking pawl 13 is pressed into blocking position by a leaf spring 14 fixed to the claw 16. The axial extension H of the blocking pawl 13 is greater than the axial extension h of the claw 16.

According to Fig. 2, the second coupling half or clutch part 4 is formed as a sleeve and fitted with inner splines 7. The coupling half 4 is mounted on a shaft 5 equipped with splines 6 and a collar 8; the coupling half 4 turns positively with the shaft but can be displaced axially. In order to displace the coupling sleeve 4 on the shaft 5, the former is provided with an annular groove 10 for receiving a control fork or the like, not shown in the drawing. The end of the second coupling half 4 facing the claw ring 1 of the first coupling half (Fig. 1) is equipped with a claw 17 projecting in axial direction and having inclined operating flanks 20 adjoining claw space 18.

The dimensions of the claw 17 and of the claw space 18 are such that, as shown in Fig. 3, when the clutch is engaged, the claw 17 is inserted in the claw space 11, and the claw 16 of the first coupling half is inserted in the claw space 18 of the coupling half 4, whereby the inclined operating flanks or faces 15 and 20, which are positioned substantially transversely to the direction of rotational movement of the claw portions of the clutch part, abut against each other.

The claw 17 (Fig. 2) is provided with a recess 19 having a contact surface 19a which is parallel to the claw face 17'. The axial extension of the recess or cut-out 19, 19a corresponds at least to the difference H—h. An approach surface 21 prevents the working edge 13b on the blocking portion 13a from being worn when it slides onto the cylindrical surface of the coupling half 4. Surface 21 forms the bottom of a cut-out on the outer edge of flank 20, which cut-out would be worked into part 4 by the pawl 13 anyway upon continuous operation of the clutch, particularly if the pawl were made of a harder material than part 4.

With the aid of Figs. 3 to 5, operation of the claw coupling may be described as follows:

From shaft 5 power is normally transmitted to the sprocket wheel 2. The clutch is adapted to be temporarily disengaged, for example, when it is desired to rotate wheel 2 temporarily in reverse direction. By means of a control fork engaging the annular groove 10 of sleeve 4, the latter is moved to the left as viewed in the drawings and is disengaged from the coupling part 1. The extent of movement of part 4 to the left is limited by collar 8, which is part of shaft 5, and is only a little in excess of $h$. The cylindrical part of the sleeve 4 has thereby slid out under the blocking portion 13a so far that the blocking portion can fall into the cut-out 19 (Figs. 4 and 2). The coupling ring 1 is free to turn on shaft 5 but is prevented from moving axially on shaft 5, for example, by a shoulder on the shaft and a locking ring. Spring 9 inserted between the collar 8 of shaft 5 and the sleeve 4 is compressed when member 4 is moved to the left. If the pressure in the axial direction exerted by the control fork on sleeve 4 stops, spring 9 presses the contact surface 19a of the cut-out or recess 19 against the surface 13c on the blocking portion 13a, thereby preventing re-engagement of the clutch. In this disengaged position, the claw ring 1 and the sprocket wheel 2 can rotate in the direction of the arrow 22, whereby the pressure of spring 9, acting in axial direction, is received by the pawl member during a small angle of rotation of the clutch part 1. Upon further rotation in the direction of arrow 22, pawl 13 moves out of the cut-out or recess 19 and the face of claw 17 (Fig. 5) runs on the face of claw 16, whereby the blocking surface 13c is relieved from the pressure of spring 9. With further rotation of the coupling half 1 in the direction of arrow 22, the end surface of claw 16 slides along the end surface 17' of the claw portion of member 4, whereby the mutual contact increases gradually to full coverage. The blocking pawl 13 thus comes into the free space between the claw spaces 11, 18 and its blocking portion 13a falls inward under the action of spring 14.

If the claw 16 slides further in the direction 22, coverage of the faces of claws 16 and 17 is reduced, and pawl 13 runs on the approach surface 21 of claw 17. When rotating the coupling half 1 further, the edge 13b runs on the cylindrical outside surface of sleeve 4, and the blocking member 13 rides on said surface and is pressed thereto by the action of spring 14. When the coupling half 1 has made a complete revolution, the edge 17a of the claw 17 slides down over the surface 16a of claw 16, and the sleeve 4 moves under the action of spring 9 to the right as viewed in the drawings until the inclined flank or face 15' comes to lie on the inclined face 20 of claw 17. In this way, claw sleeve 4 again comes into the engaged initial position (Fig. 3).

Instead of providing only one claw 16, 17 on each of the coupling halves 1, 4, respectively, and thereby having to rotate the disengaged coupling parts through a whole revolution until automatically coupling again, it would be possible to provide two or more claws, whereby the relative angle of rotation between the two coupling halves is reduced to a corresponding fraction of a complete revolution.

I claim:

1. A rotary clutch mechanism comprising two clutch parts adapted to rotate relatively to one another through a predetermined angle of relative rotation, one part having a claw portion having a cylindrical surface and an end surface disposed at a right angle to the axis of rotation of the clutch, and a recessed portion in diametrically opposed position with respect to said claw portion; the other part having a claw portion and a recessed portion mating the recessed portion and the claw portion of the first part; a pawl member pivoted to the second clutch part on an axis parallel to the rotation axis of the clutch and having a portion adapted to drop into the recessed portion of the second clutch part; a recess in the claw portion of the first part adapted to receive said pawl member for preventing axial displacement of said claw portions into the mating recessed portions; the axial extension of said pawl member being greater than the axial extension of the claw portions and the axial extension of said recess being substantially equal to the difference between the axial extension of the clutch pawl and that of a claw portion, said recess being sufficiently short in arcuate length to lift the pawl out of engagement therewith and said pawl being adapted to ride on the cylindrical surface of the claw portion of the first part when relative rotation between the clutch parts takes place while the clutch parts are disengaged, for making the clutch ready for re-engagement after sufficient relative rotation of the clutch parts to place the claw portions and recessed portions in mating position.

2. A clutch mechanism as defined in claim 1, said pawl member having an arcuate surface matching the cylindrical surface of the claw portion of the first part, and said second clutch part having a spring attached thereto and engaging said pawl member for yieldingly swinging the latter into the recessed portion of the second part.

3. A clutch mechanism as defined in claim 1, said claw portions having mating abutting faces positioned substantially transversely to the direction of their rotational movement, and the claw portion of the first part having a running-on surface connecting one abutting face of the claw portion of the first part with the cylindrical surface of the claw portion for facilitating running of the pawl member on the cylindrical surface upon relative rotation of the clutch parts.

4. A clutch mechanism as defined in claim 1, said claw portions having sloping mating abutting faces positioned transversely to the direction of their rotational movement for gradual axial engagement of the claw portions.

5. A rotary clutch mechanism comprising two clutch parts adapted to rotate relatively to one another through a predetermined angle of relative rotation, one part having a claw portion having a cylindrical surface and an end surface disposed at a right angle to the axis of rotation of the clutch, and a recessed portion in diametrically opposed position with respect to said claw portion; the other part having a claw portion and a recessed portion mating the recessed portion and the claw portion of the first part; a pawl member pivoted to the second clutch part on an axis parallel to the rotation axis of the clutch and having a portion adapted to ride on the cylindrical surface of the claw portion of the first part when the clutch parts are engaged, and to drop into the recessed portion of the second clutch part when the clutch parts are disengaged, and to slide on the end surface of the claw portion of the first part; the axial extension of said pawl member being greater than the axial extension of the claw portions and the claw portion of the first part having a running-on surface portion for said pawl adapted to lift said pawl for riding on the cylindrical surface of the claw portion of the first part when relative rotation between the clutch parts takes place while the clutch parts are disengaged, for making the clutch ready for reengagement after sufficient relative rotation of the clutch parts to place the claw portions and recessed portions in mating position.

ALBERT MOESSINGER.

REFERENCES CITED

The following references are of record in the file of this patent:

UNITED STATES PATENTS

| Number | Name | Date |
|---|---|---|
| 1,434,772 | Cartlidge | Nov. 7, 1922 |

FOREIGN PATENTS

| Number | Country | Date |
|---|---|---|
| 27,819 | Great Britain | Dec. 17, 1907 |
| 606,732 | Great Britain | Aug. 19, 1948 |
| 165,373 | Germany | Dec. 1, 1905 |